(12) United States Patent
Denoon-Stevens et al.

(10) Patent No.: US 7,693,080 B2
(45) Date of Patent: Apr. 6, 2010

(54) NETWORK LOOP MONITOR

(75) Inventors: David Denoon-Stevens, Cape Town (ZA); Neels Paul De Villiers, Ridgeworth (ZA)

(73) Assignee: GE Security, Inc., Bradenton, FL (US)

( * ) Notice: Subject to any disclaimer, the term of this patent is extended or adjusted under 35 U.S.C. 154(b) by 366 days.

(21) Appl. No.: 10/596,717

(22) PCT Filed: Dec. 21, 2004

(86) PCT No.: PCT/ZA2004/000159

§ 371 (c)(1),
(2), (4) Date: Oct. 10, 2006

(87) PCT Pub. No.: WO2005/069537

PCT Pub. Date: Jul. 28, 2005

(65) Prior Publication Data

US 2007/0140136 A1    Jun. 21, 2007

(30) Foreign Application Priority Data

Dec. 22, 2003    (ZA) ................................ 2003/9885

(51) Int. Cl.
*H04J 1/16* (2006.01)
(52) U.S. Cl. ...................................... 370/242; 370/249
(58) Field of Classification Search ............. 370/251; 709/251

See application file for complete search history.

(56) References Cited

U.S. PATENT DOCUMENTS

| | | | |
|---|---|---|---|
| 5,473,752 A | 12/1995 | Beistle et al. | |
| 5,787,258 A * | 7/1998 | Costa et al. | 709/251 |
| 2002/0159402 A1* | 10/2002 | Binder | 370/296 |
| 2003/0017845 A1* | 1/2003 | Doviak et al. | 455/556 |
| 2003/0084112 A1* | 5/2003 | Curray et al. | 709/208 |

FOREIGN PATENT DOCUMENTS

| | | |
|---|---|---|
| EP | 1069733 A | 1/2001 |
| EP | 1211849 A | 6/2002 |

OTHER PUBLICATIONS

Desmarais, Louis. Applied Electro-Optics. Prentice Hall. Dec. 5, 1997 p. 244.*
Clark R et al: "RS-232C/422/485 Line Isolation Solves More than Fault Problems" EDN Electrical; Design News, Rogers Pub. Co., Englewood, Colo, US, vol. 40, No. 20, (Sep. 28, 1995).

* cited by examiner

*Primary Examiner*—Huy D Vu
*Assistant Examiner*—Stephen J Clawson
(74) *Attorney, Agent, or Firm*—Global Patent Operation; Jonathan E. Thomas

(57) ABSTRACT

A network loop monitor (10) is disclosed which comprises an RS485 port (16) for connection to a host which receives and transmits data. The port (16) comprises termination jumpers (14), a transmitter/receiver (34) and an isolator (36). The monitor (10) includes two further RS485 ports (18, 20) each of which has a termination (26, 28), a transmitter/receiver (42, 44) and an isolator (38, 40). A relay (22) controls contacts (24) in the line pair (12). Router logic (32) controlled by a microprocessor (30) determines the status of the loop monitor.

9 Claims, 3 Drawing Sheets

NETWORK LOOP MONITOR

FIELD OF THE INVENTION

THIS INVENTION relates to networks.

BACKGROUND TO THE INVENTION

In early computer systems, the construction comprised a mainframe computer and a series of terminals connected to the mainframe. The terminals had little or no processing power.

Over a period of time the nature of computer systems has changed. The mainframe has been replaced by a series of individual computers connected together in a network. In an office environment each individual computer can be a personal computer which is also called a desktop computer.

In the fire detection industry the personal computers of an office network are replaced by so-called panels each of which has computing power and which are connected together in a network. The panels "talk" to one another and to the fire detectors which are connected to them.

In all networks, the requisite network integrity is lost should a cable be damaged, resulting in an open circuit, or should the network be shorted out. In an office environment this is more of an inconvenience than a major problem. Some unsaved data may be lost but usually any problems which have arisen can be rectified without there being long term effects. However, when the network is that of a fire detection system the consequences of the system being down for any period of time can be catastrophic.

Networks which are "self healing" have been proposed. Simply by way of example a system is known in which each node on a ring only "speaks" to its neighbour. If a host has any data which it needs to transmit, the data is loaded onto the controlling inter-node protocol. The data is then passed from node to node until all the nodes on the ring have received the data. The nodes continuously "handshake" with each other and, in the event of a fault which prevents data being transmitted along a specific route, an alternative route is arranged by the protocol.

The present invention seeks to provide an improved network based on the RS-485 protocol and which is capable of recovering from open and short circuits thereby to restore network integrity.

BRIEF DESCRIPTION OF THE INVENTION

According to one aspect of the present invention there is provided a network comprising a loop having therein a plurality of loop network monitors, each loop network monitor having an RS-485 port connected to a host which transmits and receives data, and two further RS-485 ports by way of which the monitors are connected into the loop.

Router logic under the control of a microprocessor can be provided for controlling the transmission of data through the monitor.

The first mentioned RS-485 port can comprise termination jumpers which can be set in dependance on the nature of the host, an RS-485 transceiver and means for isolating the host from the router logic.

Each of said further ports can comprise a termination, an RS-485 transceiver, and means for isolating the router logic from the loop.

Each of said means for isolating can comprise an opto coupler.

According to a further aspect of the present invention there is provided a network loop monitor comprising an RS-485 port for connection to a host which transmits and receives data, and two further RS-485 ports for connecting the monitor into the loop.

The first mentioned RS-485 port can comprise termination jumpers which can be set in dependance on the nature of the host, an RS-485 transceiver and means for isolating the host from the router logic.

Each of said further ports can comprise a termination, an RS-485 transceiver, and means for isolating the router logic from the loop.

Each of said means for isolating can comprise an opto coupler.

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION OF THE DRAWINGS

Figure 1:
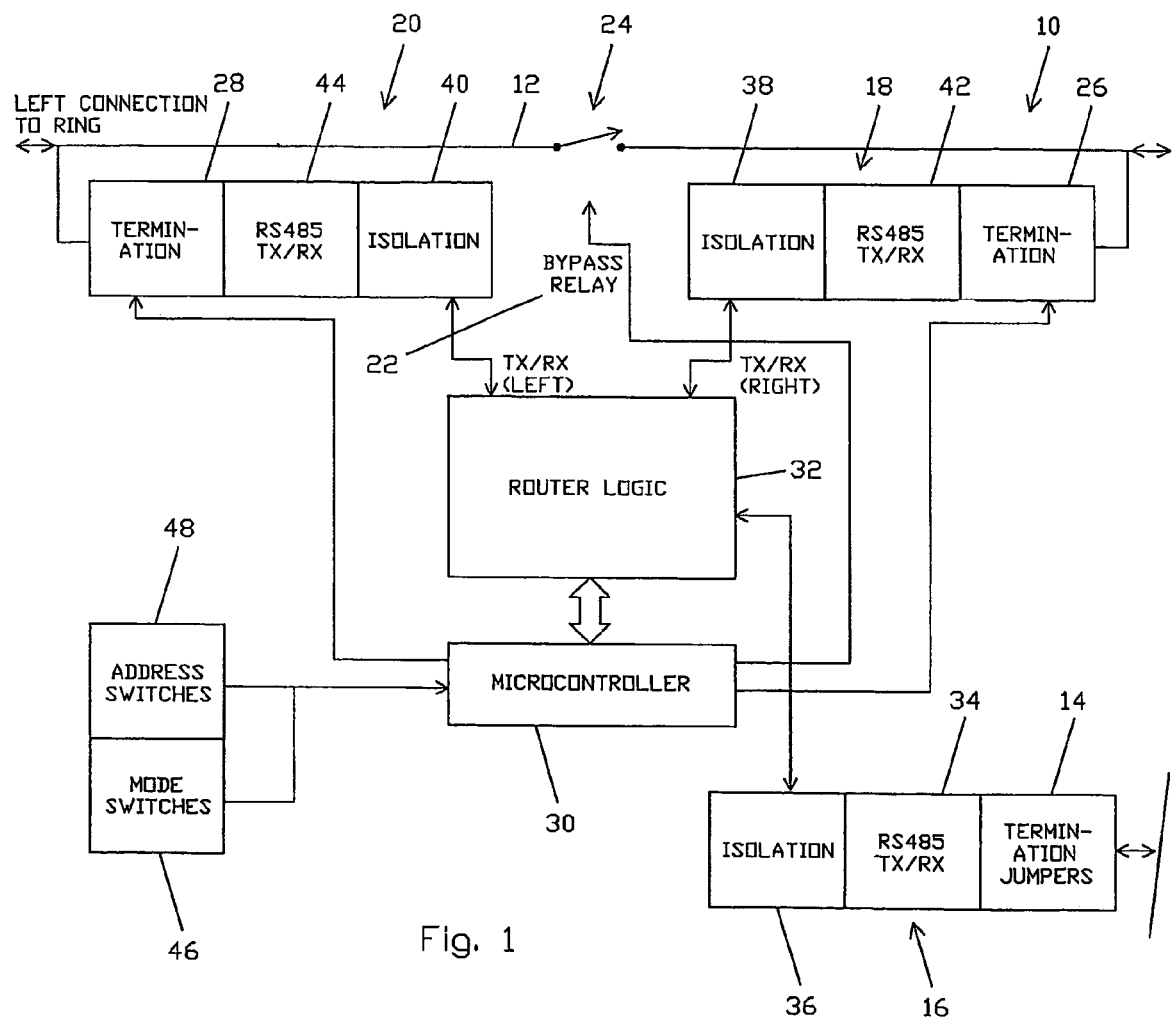
FIG. 1 is a diagram of a network loop monitor.

The embodiment of the present invention illustrated in FIG. 1 is a multidrop network based on the RS-485 protocol and using what is known as a class A-ring. A class A ring is a wire pair which runs in a loop, starting and ending at the same place. The loop is driven by a signal from the one end, and the same signal is monitored at the other end. Alternatively signals injected by nodes on the loop are monitored at each end of the loop. In this way, the integrity of the wire pair can be monitored by comparing the signals at each end and ensuring that they coincide.

The network loop monitor 10 shown in FIG. 1 is connected to a wire pair 12 which forms a closed loop. There is a monitor 10 for each so-called RS-485 host. In the present embodiment each host is in the form of a fire detector panel (not shown in FIG. 1) connected to the monitor by way of an RS-485 port 16. Two further ports 18 and 20 are used to connect the monitor 10 to the wire pair 12. The ports 16, 18 and 20 will be described in more detail hereinafter.

The monitor 10 includes a relay 22 the contacts 24 of which are in the wire pair 12. The contacts 24 of one of the monitors in the loop constituted by the wire pair 12 is normally open and this monitor is the network's "master" during normal operation. The contacts 24 of the remaining monitors are closed.

The wire pair 12 on either side of the break in the loop constituted by the open contacts 24, is "terminated" at 26 and 28 by the monitor 10. "Termination" is a well understood concept in RS-485 technology and involves providing an electrical resistance and fail safe biassing at the end of a line to prevent signal reflections (which are sometimes called "echoes"). If there is poor line impedance matching, reflections or echoes manifest themselves and these reflections are false signals which can interfere with operation. The fail-safe bias maintains a bias signal on the wire pair during intervals between transmissions. This ensures that the effects of noise on the line are eliminated or at least minimised.

Activation of the terminations 26, 28 is under the control of a microprocessor 30. If the microprocessor holds the contacts 24 open, it also activates the terminations 26, 28. If the contacts 24 are closed, meaning that the monitor in question does not constitute the ends of the loop, then the terminations 26, 28 are inactive.

The monitor further includes router logic 32 which is controlled by the microprocessor 30. The port 16 comprises termination jumpers 14, an RS-485 transmitter/receiver 34 and an isolator 36. The ports 18 and 20 comprise isolators 38, 40, RS-485 transmitter/receivers 42, 44 and the terminations 26, 28. The terminations 26, 28 are under the control of the microprocessor 30 whereas the termination jumpers are set manually in dependence on the nature of the host panel to which they are connected.

An incoming signal, if the contacts 24 are open and the termination 26 is enabled, passes through the termination 26. As explained above the termination prevents reflections. The signal reaches the RS-485 transceiver chip 42 which converts the signal from the RS-485 voltage levels which exist on the wire pair 12 to standard levels as used by logic and microprocessor circuitry. The isolator 38 is in the form of an opto coupler which converts the incoming signal to light and then back to an electric signal whereby isolation between the wire pair 12 on the one hand and the router logic 32 and micro controller 30 on the other hand is achieved.

Mode switches 46 and address switches 48 are connected to the microprocessor 30. The switches 48 are used uniquely to identify each network monitor in the system. The address set as 1 identifies the master network monitor and addresses 2 to 255 identify the slave network monitors. If address "0" is set, the monitoring function of the network monitor is disabled and the monitor then serves solely as a repeater. The mode switches set the parameters of the serial data transmitted to the network line monitors by the hosts. The parameters in question are baud rate, parity, and number of bits. These parameters are set to enable the data to be monitored correctly.

There are also mode switches which can be used to set the network monitors into a "booster" mode in which the relay contacts 24 open and data reaching the network line monitor is routed through the router logic and re-transmitted to the next network line monitor on the loop.

During normal operation, the switches 24 of all monitors in the circuit are closed except that of the master monitor, that is, the monitor with address 1. The switch 24 of this monitor is open. The terminations 26, 28 of the master monitor are switched in. The loop thus runs from the termination 26, through the switches 24 of all the other monitors and back to the termination 28.

When a network monitor 10 receives a signal from the host panel connected to port 16, the router logic 32 routes it to one or both ports 18, 20 depending on the setting of the mode switches 46. If the monitor 10 is the master monitor or a slave monitor it transmits the signal to one port 18, 20. If the monitor is set as a booster it transmits the signal to both ports 18 and 20.

Assuming that the monitor is a slave monitor, the contacts 24 are closed and the signal passes from the router through the isolator 40 to the RS-485 transceiver 44 and thence to the termination 28. The transceiver 44 is switched to its transmitter mode by the router logic 32 and the signal is thus driven onto the wire pair 12.

The transmitted signal reaches all the other monitors 10 on the loop which will "see" the signal at the ports 18 which are switched to the receive mode. The signal is picked up by the transceiver 42 and passed via the isolator 38 to the router logic 32. The router logic sends the signal to the host connected to the port 16. On completion of the transmission, all the microprocessors in the loop (which detect or "listen in" to the transmissions) reset the router logics 32 which in turn switch the transceivers 42, 44, 34 back to receive mode. The network is now clear for another host to transmit a signal.

The master monitor 10 checks the integrity of the circuit by comparing data received at the port 18 with data received at the port 20. If the ports 18, 20 do not detect the same signal, then there is a fault on the pair 12 which is preventing one of the signals on the loop from reaching the master monitor.

To ensure that faults are detected, and the network collapsed if the 15 fault is significant enough, it is possible to provide a number of error checking counters. The following is an example of a suitable error checking system.

The three counters of this system work on the basis that if the ratio between the data that the counter detects as good data and the data that the counter detects as bad data exceeds a preset limit, either a healing or disconnect operation is initiated. The type of operation initiated depends on what the data is that the counter is checking. The ratio is determined on the basis of a "moving window" which means that the ratio of good data to bad data in the preceding period of a number of seconds is determined. The number of seconds varies from counter to counter.

In the specific system under consideration there is a counter which monitors the transmissions from the host. No data being transmitted is, in this counter's program, determined to be good data. This counter can have a moving window of up to, for example, fifteen seconds. In the event that the preset error ratio is exceeded, the micro controller 30 instructs the router 32 to disable the host port 16. The port 16 remains disconnected until the error ratio has fallen below the preset value. Network collapse is not initiated as the host transmitting too much bad data is disconnected before the bad data causes network collapse.

The second counter checks the integrity of the ring constituted by the pair 12. The moving window of this counter can be twice as long as that of the first counter discussed. Only the master network monitor includes a counter of this type and it compares the data on the ports 18 and 20. As with the host monitor's counter, the absence of data is deemed to constitute good data. In the event that the error ratio rises too high a signal initiating network collapse is initiated by the master monitor.

The third counter is the data quality counter. Each of the monitors has such a counter and checks all data "seen" by the ports 18 and 20.

In respect of these counters, the absence of any data is deemed to be bad data when the error ratio is being calculated. The length of the moving window is longer than that of the other two counters discussed. As an example it can be twice the length of the window of the loop integrity counter plus the amount of time required to complete the healing operation which it or the ring integrity counter may initiate.

The counter of a slave monitor, on detecting an unacceptable error ratio, opens its relay contacts 24 thereby to generate a network collapse signal.

The master monitor 10 is programmed, following such collapse, to institute the self healing program.

A signal from the master monitor is transmitted through either the port 18 or the port 20 onto the wire pair 12. The relay contact 24 of the master monitor is open at this time to ensure that the signal travels in the desired direction around the loop.

The signal, upon reaching a slave monitor 10, closes that monitor's contacts 24 and is transmitted on to the next monitor in the sequence. In the event that the next slave monitor does not receive the signal, the slave monitor activates its termination 26 or 28 and becomes the end monitor of that part of the circuit.

The master monitor then directs a "healing signal" in the other direction from the other port 20, 18 and the procedure is repeated.

A protocol is used whereby the master monitor exchanges "hand shake" signals with each successive slave monitor during the continuing process of sending and acknowledging data. In the event that one of the slave monitors fails to exchange "hand shakes" with the master monitor when required, it is assumed that the last link is faulty.

At the end of a healing operation, but in the event that there is an unrectified fault on the wire pair 12, the contacts of the master monitor close so that it acts as a slave and the monitors on each side of the fault activate their terminations thereby isolating the faulty part of the line which lies between them. Only when the fault is repaired and the network reset does the master monitor resume that function.

If a slave monitor 10 has opened its contacts 24 due to a collapse command or a time out, that is, the total absence of data for a predetermined period of time, the contacts 24 will remain open for a predetermined time waiting for a command from the master monitor. If no such command is received one of the slave monitors, that with the shortest waiting time which is dependant on its address switches, will assume the role of a master monitor. Because all the waiting times are different, no two monitors on the network will assume the role of master network monitors simultaneously.

Figure 2:
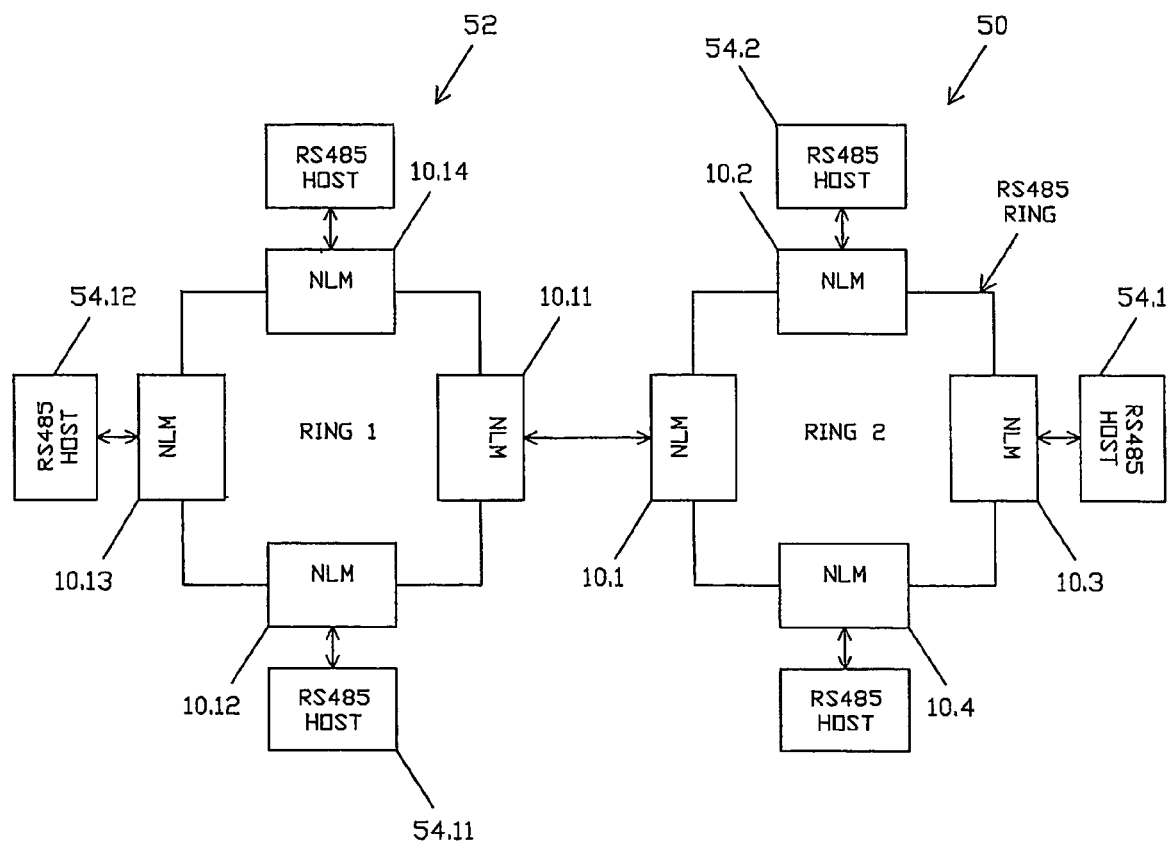
FIG. 2 illustrates a multiple loop network.

In FIG. 2, two loops 50, 52 are shown. One loop comprises monitors 10.1 to 10.4 and the other comprises monitors 10.11 to 10.14. RS-485 hosts 54.1, 54.2 etc and 54.11, 54.12 etc. are connected to the ports 16 of the monitors. One monitor of each ring (the monitors 10.1, 10.11 in the illustrated form) have their ports 16 connected.

Figure 3:
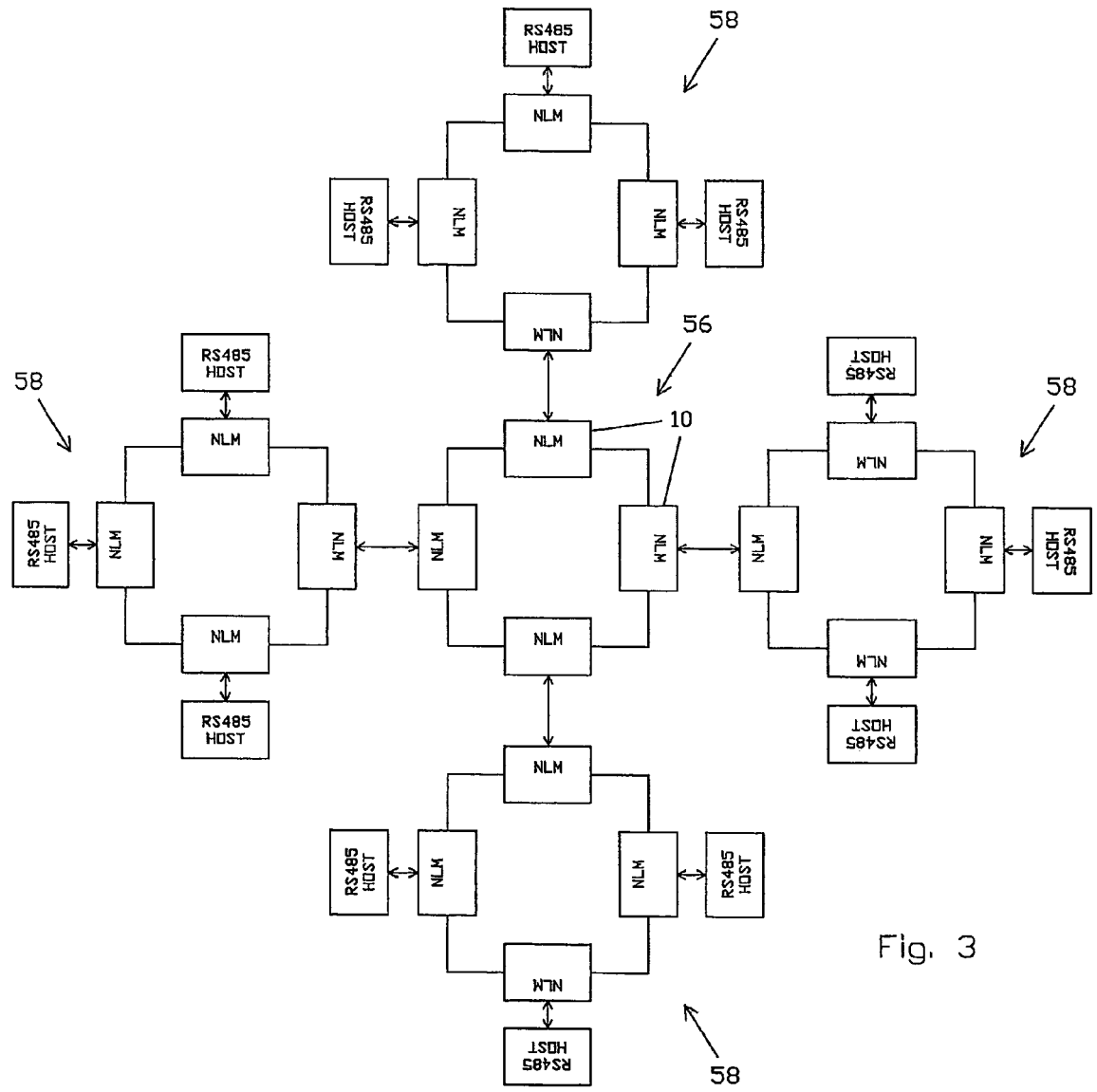
FIG. 3 illustrates a further multiple loop network.

In FIG. 3 the network comprises a central ring 56 and four outer rings 58. The ring 56 is connected to the rings 58 by way of the ports 16 of the four monitors 10 in the central ring and the port 16 of one monitor 10 in each outer ring.

The invention claimed is:

1. A network monitor configured to couple with a wire pair configured in a loop, the wire pair having a contact therein movable between a closed position and an open position, the network monitor comprising:
   a first port having:
      a first termination coupled with the wire pair on one side of the contact,
      a first transceiver chip coupled with the first termination and configured to convert signals sent over the wire pair from RS-485 voltage levels to standard levels,
      first isolator coupled with the first transceiver chip;
   a second port having:
      a second termination coupled with the wire pair on an opposite side of the contact,
      a second transceiver chip coupled with the second termination and configured to convert signals sent over the wire pair from RS-485 voltage levels to standard levels;
      a second isolator coupled with the second transceiver chip;
   a router coupled with the first port via the first isolator and coupled with the second port via the second isolator;
   a microcontroller coupled with the router, the first termination and the second termination;
   a third port configured to be coupled with a fire detector panel, the third port having:
      a third isolator coupled with the router,
      a third RS-485 transceiver chip coupled with the third isolator, and
      termination jumpers coupled with the third transceiver chip,
   wherein the network monitor is configured to initiate one of a healing operation and a disconnect operation if an error ratio between good data detected by at least one counter and detected bad data detected by the at least one counter exceeds a preset limit.

2. The network monitor of claim 1, wherein the at least one counter comprises:
   a first counter configured to monitor transmissions from the fire detector control panel,
      wherein no data being transmitted from the fire detector control panel is considered to be good data,
      wherein the first counter is configured to have a first moving window of predetermined length, said error ratio being determined based on the moving window, and
      wherein, if the preset level is exceeded, the microcontroller is configured to instruct the router to disable the third port 16 until the ratio has fallen below the preset level.

3. The network monitor of claim 2, wherein the at least one counter further comprises:
   a second counter configured to check an integrity of the looped wire pair,
      wherein an absence of data at the first port and the second port is considered to be good data;
      wherein the second counter is configured to have a second moving window of a length that is about twice the predetermined length of the first counter.

4. The network monitor of claim 3, wherein the at least one counter further comprises:
   a third counter configured to monitor quality of all data seen by the first port and the second port,
      wherein an absence of any data is deemed to be bad data, and
      wherein the third counter is configured to have a third moving window having a length longer that that of the first and second counters.

5. The network monitor of claim 4, wherein the length of the third moving window is twice the lengths of the first and second moving windows plus an amount of time required to complete the healing operation.

6. The network monitor of claim 4, wherein the network monitor is a slave monitor that is configured to open the contact to generate a network collapse signal upon detecting an unacceptable error ratio.

7. The network monitor of claim 4, wherein the network monitor is a master monitor that is configured to institute the healing operation following a network collapse via a signal that is transmitted either through the first port or the second port to ensure that the signal travels in a desired direction around the looped wire pair.

8. The network monitor of claim 7, wherein the master monitor is further configured to direct a healing signal through the other second port or the first port so that the healing signal travels in an opposite direction around the looped wire pair.

9. The network monitor of claim 8, wherein the master monitor is configured to close the contact at the end of the healing operation where an unrectified fault exists on the looped wire pair so that the master monitor acts as a slave monitor.

* * * * *